(12) United States Patent
Suzuki (10) Patent No.: US 11,295,184 B2
(45) Date of Patent: Apr. 5, 2022

(54) IMAGE PROCESSING METHOD AND APPARATUS SHIFTING AN IDENTICAL COLOR PIXEL REGION AND AVERAGING COLORS OF PIXELS

(71) Applicant: SEIKO EPSON CORPORATION, Tokyo (JP)

(72) Inventor: Masato Suzuki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/215,295

(22) Filed: Mar. 29, 2021

(65) Prior Publication Data
US 2021/0303949 A1 Sep. 30, 2021

(30) Foreign Application Priority Data
Mar. 30, 2020 (JP) .............................. JP2020-059817

(51) Int. Cl.
*G06K 15/02* (2006.01)
*G06T 3/40* (2006.01)
*H04N 1/393* (2006.01)
*H04N 1/60* (2006.01)

(52) U.S. Cl.
CPC ..... *G06K 15/1876* (2013.01); *G06K 15/1878* (2013.01); *G06T 3/4023* (2013.01); *H04N 1/3935* (2013.01); *H04N 1/6072* (2013.01)

(58) Field of Classification Search
CPC .. H04N 1/393; H04N 1/3935; H04N 1/40068; H04N 1/60; H04N 1/6072; H04N 1/40062; H04N 1/409; H04N 1/4092; G06K 15/1846; G06K 15/1869; G06K 15/1876; G06K 15/1847; G06K 15/1871; G06K 15/1874; G06K 15/1878; G06K 15/188; G06T 3/4023; G06T 5/006; G06T 5/50

See application file for complete search history.

(56) References Cited

U.S. PATENT DOCUMENTS

| 5,594,555 | A  | * | 1/1997 | Ishida  | H04N 1/40068 |
|||||| 358/296 |
| 2015/0181076 | A1 | * | 6/2015 | Mita  | H04N 1/00482 |
|||||| 358/1.2 |
| 2016/0026904 | A1 | * | 1/2016 | Hosaka  | G06K 15/1876 |
|||||| 358/1.2 |

FOREIGN PATENT DOCUMENTS

JP 2010-187177 A 8/2010

* cited by examiner

*Primary Examiner* — Scott A Rogers
(74) *Attorney, Agent, or Firm* — Global IP Counselors, LLP (57) ABSTRACT

A image processing method includes a shifting step for determining whether to shift an identical color pixel region, in which two to N pixels of an identical color are arranged consecutively in a first direction, in the first direction or a direction opposite to the first direction within the image data, provided that N is an integer of 2 or greater, and shifting the identical color pixel region in the first direction or the direction opposite to the first direction when the shifting is determined to be performed, and an averaging step, in which in the shifting step, the shifting is determined to be performed when the identical color pixel region exists across two of the unit regions, and the identical color pixel region spanning across the two of the unit regions is shifted so as to be included in any one of the unit regions.

5 Claims, 8 Drawing Sheets

IMAGE PROCESSING METHOD AND APPARATUS SHIFTING AN IDENTICAL COLOR PIXEL REGION AND AVERAGING COLORS OF PIXELS

The present application is based on, and claims priority from JP Application Serial Number 2020-059817, filed Mar. 30, 2020, the disclosure of which is hereby incorporated by reference herein in its entirety.

BACKGROUND

1. Technical Field

The present disclosure relates to an image processing method and an image processing apparatus.

2. Related Art

An image forming apparatus is disclosed which is configured to convert bitmap data of a first resolution into bitmap data of a second resolution that is lower than the first resolution (see JP 2010-187177 A).

In a resolution conversion processing that reduces resolution of image data, low resolution is achieved by decimating pixels.

When a relatively fine line (hereinafter, a ruled line and the like) such as a ruled line, character, or the like is expressed in the image data, the ruled line and the like may be partly erased by the decimation of the pixels when the image data is reduced in resolution as described above. To avoid such an inconvenience, colors of the pixels expressing the ruled line and the like are averaged between the pixels and neighboring pixels of a predetermined number before resolution conversion is performed and the colors of the ruled line and the like are remained at the neighboring pixels as well. When the resolution conversion is performed after such averaging processing, the ruled line and the like remain without being erased in the image data reduced in resolution.

Unfortunately, image quality deterioration may occur, which is, for example, the ruled line and the like partly become wider than necessary or partly appear as a double line when merely performing the averaging processing described above. Thus, improvements are required in order to resolve such image quality deterioration.

SUMMARY

A image processing method includes a shifting step for determining whether to shift an identical color pixel region in which two to N pixels of an identical color are arranged consecutively in a first direction within image data in the first direction or a direction opposite to the first direction, where N is an integer of 2 or greater, and when performance of the shift is determined, shifting the identical color pixel region in the first direction or the direction opposite to the first direction, and an averaging step for averaging, after the shifting step, colors of pixels within a unit region in which N pixels are arranged consecutively in the first direction within the image data, in which in the shifting step, performance of the shift is determined when the identical color pixel region spans across two of the unit regions, and the identical color pixel region spanning across the two of the unit regions is shifted so as to be included in any one of the unit regions.

An image processing apparatus includes a shift processing unit configured to perform shift processing of determining whether to shift an identical color pixel region in which two to N pixels of an identical color are arranged consecutively in a first direction in the first direction or a direction opposite to the first direction within the image data, where N is an integer of 2 or greater, and when performance of the shift is determined, performing shift processing of shifting the identical color pixel region in the first direction or the direction opposite to the first direction, and an averaging processing unit configured to average, after the shift processing, colors of pixels within a unit region in which N pixels are arranged consecutively in the first direction within the image data, in which when the identical color pixel region spans across two of the unit regions, the shift processing unit determines to perform the shifting, and shifts the identical color pixel region spanning across the two of the unit regions so as to be included in any one of the unit regions.

DESCRIPTION OF EXEMPLARY EMBODIMENTS

Embodiments of the present disclosure will be described below with reference to the accompanying drawings. Note that the drawings are merely exemplifications for describing the embodiment. Because the drawings are exemplifications, proportions and shapes of components may not be accurate, the components may not match each other, or the components may be partly omitted.

1. Overview Description of Apparatus

Figure 1:
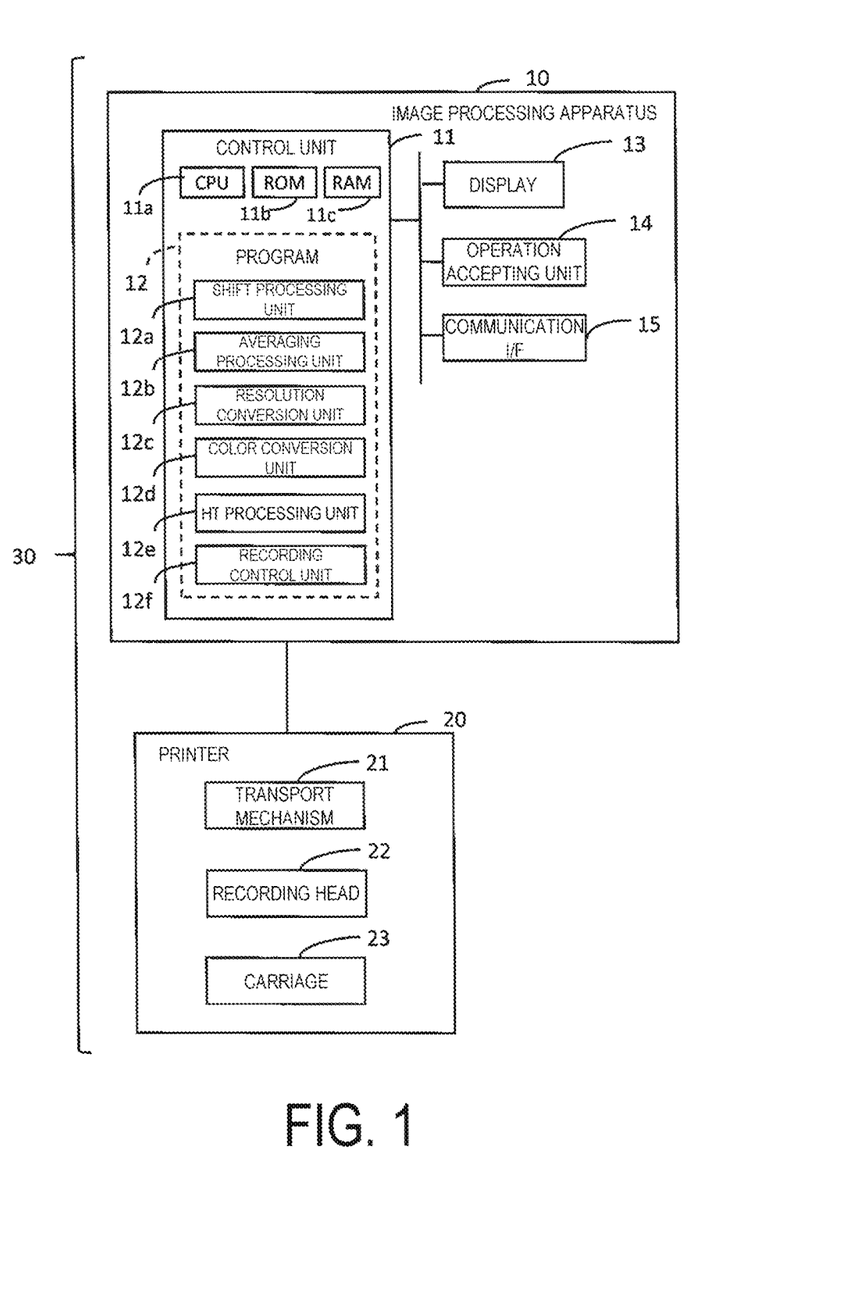
FIG. 1 is a block diagram illustrating an apparatus configuration in a simplified manner.

FIG. 1 illustrates a configuration of a system 30 according to the embodiment in a simplified manner. The system 30 includes an image processing apparatus 10 and a printer 20. The system 30 may be referred to as a recording system, image processing system, printing system, or the like. An image processing method is achieved by at least a part of the system 30.

The image processing apparatus 10 is achieved by a personal computer, server, smartphone, tablet terminal, or information processing apparatus having processing capability equivalent to these apparatuses, for example. The image processing apparatus 10 includes a control unit 11, a display 13, an operation accepting unit 14, a communication interface 15, and the like. The interface is abbreviated as IF. The control unit 11 includes one or a plurality of ICs including a CPU 11a as a processor, a ROM 11b, a RAM 11c, and the like, the other non-volatile memories, and the like.

In the control unit 11, the processor, that is, the CPU 11a executes arithmetic processing according to a program stored in the ROM 11b, the other memories, and the like, using the RAM 11c and the like as a work area. The control unit 11 performs processing according to a program 12 to implement, in cooperation with the program 12, various functions of a shift processing unit 12a, an averaging processing unit 12b, a resolution conversion unit 12c, a color conversion unit 12d, an HT processing unit 12e, a recording control unit 12f, and the like. The HT is an abbreviation of halftone. The program 12 may also be referred to as an image processing program, recording control program, printing control program, or the like. The processor is not limited to a single CPU, and may be configured to perform processing by a plurality of CPUs or a hardware circuit such as an ASIC, or may have a configuration in which the CPU and the hardware circuit cooperate to perform processing.

The display 13 is a means for displaying visual information, and constituted by a liquid crystal display, an organic EL display, or the like, for example. The display 13 may include a display and a drive circuit for driving the display. The operation accepting unit 14 is a means for accepting an operation by a user, and achieved by a physical button, a touch panel, a computer mouse, a keyboard, and the like, for example. It goes without saying that the touch panel may be achieved as one function of the display 13. The display 13 and the operation accepting unit 14 can be collectively referred to as an operation panel of the image processing apparatus 10.

The display 13 and the operation accepting unit 14 may be a part of the configuration of the image processing apparatus 10, and may also be peripheral devices external to the image processing apparatus 10. The communication IF 15 is a generic term of one or a plurality of IFs for the image processing apparatus 10 to perform wired or wireless communication with an outside in compliance with a prescribed communication protocol including a publicly known communication standard. The control unit 11 communicates with the printer 20 via the communication IF 15.

The printer 20 performs recording on a recording medium under control by the image processing apparatus 10. A recording scheme employed by the printer 20 may be various schemes such as inkjet scheme, electronic photography scheme, thermal scheme, and the like. As an example, the printer 20 is an inkjet printer configured to discharge a liquid such as ink to perform recording. Although a detailed description of the inkjet printer is omitted, the printer 20 overall includes a transport mechanism 21, a recording head 22, and a carriage 23.

The transport mechanism 21 includes a roller that transports the recording medium, a motor for driving the roller, and the like, and is configured to transport the recording medium in a predetermined transport direction. The recording medium is representatively paper, and may be a medium of a material other than the paper as long as the recording medium is a medium on which recording by a liquid can be performed. The recording head 22 includes a plurality of nozzles configured to discharge dots as liquid droplets, and is configured to discharge dots from the nozzles on the recording medium being transported by the transport mechanism 21. The printer 20 controls driving of the nozzles according to recording data to allow the nozzles to discharge or not discharge the dots. The recording head 22 is configured to discharge ink of multiple colors such as cyan (C), magenta (M), yellow (Y), and black (K), for example.

The carriage 23 is equipped with the recording head 22, and configured to move in a movement direction intersecting a transport direction of the recording medium. That is, a liquid discharging operation by the recording head 22 in conjunction with the movement of the carriage 23 is combined with the transport of the recording medium by the transport mechanism 21 to record an image expressed by the recording data on the recording medium.

The image processing apparatus 10 and the printer 20 may be connected through a non-illustrated network. The printer 20 may be a combined machine having a plurality of functions of a function as a scanner, as well as a facsimile communication function and the like, in addition to a printing function. The image processing apparatus 10 may be achieved not only by a stand-alone one information processing apparatus, but also by a plurality of information processing apparatuses communicatively connected to one another via a network. For example, among various functions of the control unit 11 illustrated in FIG. 1, a device that achieves the shift processing unit 12a and the averaging processing unit 12b may be separated from a device that achieves the resolution conversion unit 12c, the color conversion unit 12d, the HT processing unit 12e, and the recording control unit 12f.

Alternatively, the image processing apparatus 10 and the printer 20 may be a recording apparatus configured by integrating these apparatuses. That is, the system 30 may actually be a single recording apparatus 30 including the image processing apparatus 10 and the printer 20. Thus, processing performed by the image processing apparatus 10 described below may be interpreted as processing performed by the recording apparatus 30.

2. Description of Image Processing

Figure 2:
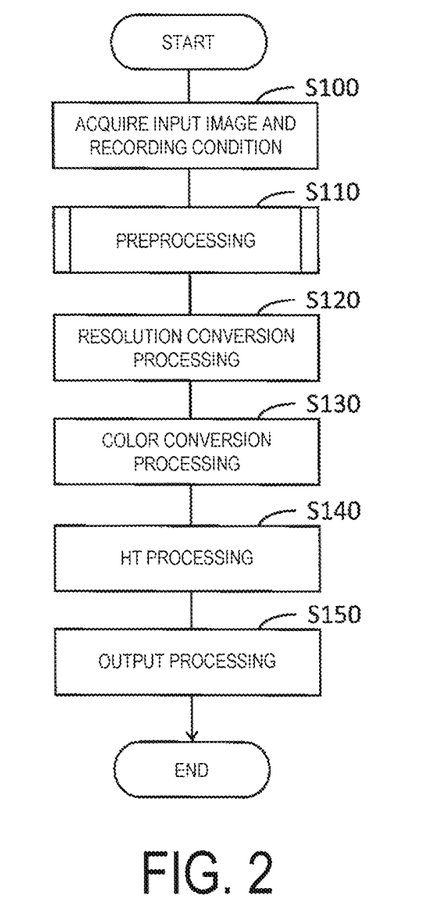
FIG. 2 is a flowchart illustrating a recording control processing.

FIG. 2 illustrates, in a flowchart, recording control processing that the control unit 11 performs according to the program 12. In the recording control processing, preprocessing in step S110 corresponds to the image processing method characteristic in the embodiment.

The control unit 11, upon accepting a recording command of an input image, starts the recording control processing. In step S100, the control unit 11 acquires the input image. The user operates the operation accepting unit 14 while viewing a UI screen displayed on the display 13, to optionally select the input image to provide the recording command of the input image, for example. The UI is an abbreviation of user interface. The control unit 11 acquires the input image thus selected from a storage source such as a predetermined memory.

The input image acquired in step S100 is image data in a bitmap format defining colors of pixels in a predetermined color coordinate system. The predetermined color coordinate system herein mentioned includes varieties of RGB (red, green, blue) color coordinate system, CMYK color coordinate system, XYZ color system, L*a*b* color coordinate system, and the like, for example.

Further, in step S100, the control unit 11 acquires a recording condition of the input image. Similar to the selection of the input image, the recording condition may be information designated by the user, or information acquired from the printer 20 as information inherent to the printer 20. The recording condition contains various information such as recording mode such as color or monochrome, types of the recording medium, and the number of recordings. The recording condition also contains recording resolution information. The resolution is the number of pixels per inch.

In step S120 described below, resolution conversion processing for matching vertical and horizontal resolutions of the input image with vertical and horizontal recording resolutions, respectively, is performed. In the embodiment, descriptions will be given assuming a case where a resolution of the input image is higher than the recording resolution. That is, in step S120, resolution conversion processing for reducing the resolution of the input image is performed.

Although not specifically illustrated in FIG. 2, when both the vertical and horizontal resolutions of the input image are lower than each of the vertical and horizontal recording resolutions, the control unit 11 performs resolution conversion processing for enhancing the resolution of the input image in step S120 without performing step S110.

In step S110, the shift processing unit 12a and the averaging processing unit 12b perform the preprocessing on the input image. The preprocessing overall includes a "shifting step" for determining whether to shift an "identical color pixel region" in which two to N pixels of an identical color are arranged consecutively in a first direction in the first direction or a direction opposite to the first direction within the image data, and when performance of the shift is determined, shifting the identical color pixel region in the first direction or the direction opposite to the first direction, and an "averaging step" for averaging, after the shifting step, colors of pixels within a "unit region" in which N pixels are arranged consecutively in the first direction within the image data. The N is an integer of 2 or greater.

Figure 3:
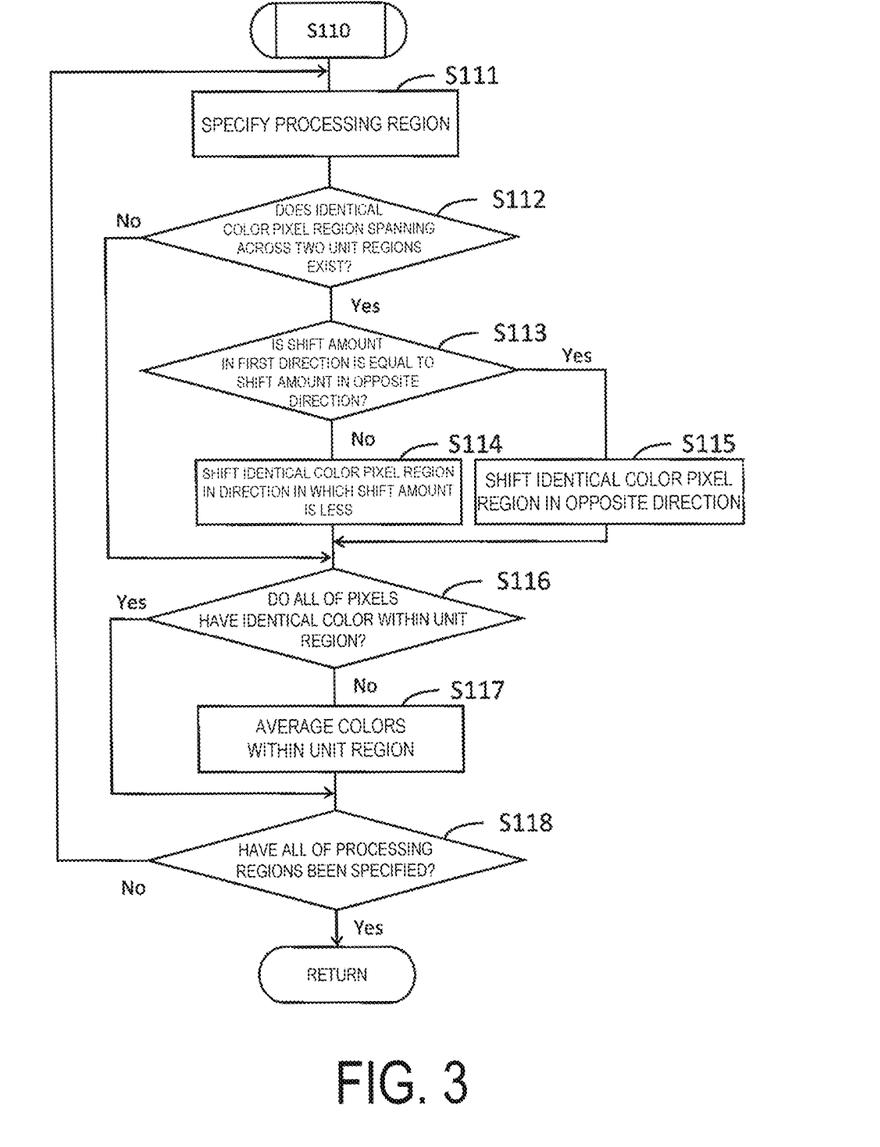
FIG. 3 is a flowchart illustrating details of step S110.

FIG. 3 illustrates details of step S110 in a flow chart.

In step S111, the shift processing unit 12a specifies one "processing region" on which the shifting step and the averaging step are to be performed within the input image. Step S111 corresponds to a "region specifying step". The processing region is a region in which pixels are arranged consecutively in the first direction within the input image, the processing region including a plurality of the unit regions described above.

For convenience of explanation, the horizontal direction of the input image is referred to as an X direction, and the vertical direction of the input image is referred to as a Y direction.

The "first direction" is a name, expedientially used in step S110, of the direction in which the resolution of the image is reduced by the resolution conversion processing in step S120. For example, when a resolution in the Y direction of the input image is 600 dpi and the resolution in the Y direction of the input image is converted into 300 dpi in step S120, the Y direction is grasped as the first direction in step S110. Further, for example, when a resolution in the X direction of the input image is 600 dpi, and the resolution in the X direction of the input image is converted into 300 dpi in step S120, the X direction is grasped as the first direction in step S110. Thus, provided that the input image is reduced in resolution in each of the X direction and the Y direction in step S120, step S110 in which the X direction is the first direction and step S110 in which the Y direction is the first direction are performed for the input image.

Hereinafter, the description will be continued exemplifying a case where the Y direction is the first direction. The case where the Y direction is the first direction means, more specifically, that a positive orientation in the Y direction (+Y direction) is the first direction, and a negative orientation in the Y direction (−Y direction) is a direction opposite to the first direction. Note that when the X direction is grasped as the first direction, the positive orientation in the X direction (+X direction) is the first direction, and the negative orientation in the X direction (−X direction) is the direction opposite to the first direction.

Figure 4:
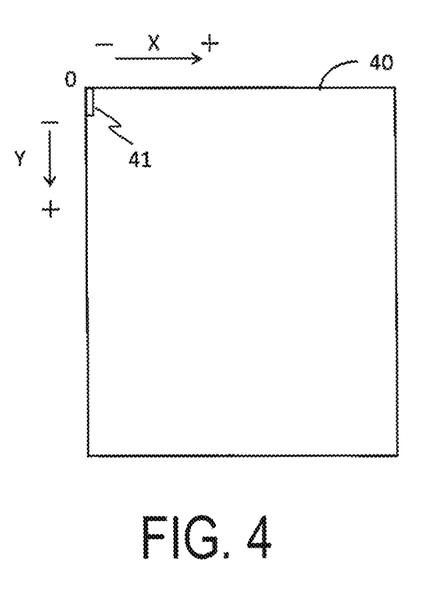
FIG. 4 is a diagram illustrating a state where one processing region is specified in step S111.

FIG. 4 illustrates a state where one processing region 41 is specified in step S111. The reference sign 40 indicates image data 40 as the input image acquired in step S100. Although illustrations are omitted in FIG. 4, some content such as a ruled line and the like, photograph, illustration, text, and the like are expressed within the image data 40. The shift processing unit 12a specifies the region in which pixels are arranged consecutively in the Y direction within the image data 40, the region being the processing region 41 including the plurality of the unit regions. It is sufficient for the shift processing unit 12a to sequentially shift a pixel range that is to be the processing region in the Y direction in an integral multiple unit of the unit region every time step S111 is repeated, to specify one processing region 41, provided that the original point position "0" in the X direction and the Y direction in the image data 40 is designated as a starting position of specifying the processing region, for example. It is also sufficient for the shift processing unit 12a, upon completing specifying all regions within one pixel row elongated in the Y direction as the processing regions, to specify the processing region from the position of the original point "0" in the Y direction again within the next pixel row adjacent to the pixel row in the X direction.

In step S112, the shift processing unit 12a determines whether an identical color pixel region spanning across two unit regions exists within the processing region 41 specified in step S111. Then, when the identical color pixel region spanning across two unit regions exists, the process proceeds from a determination of "Yes" to step S113, while when the identical color pixel region spanning across two unit regions does not exist, the process proceeds from a determination of "No" to step S116. That is, the determination whether the "identical color pixel region spanning across two unit regions exists" is a determination of the "identical color pixel region is to be shifted".

Here, the number N of pixels that constitute the unit region will be described. The unit region is a processing unit in which colors are averaged so that the ruled line and the like are not erased even after the resolution conversion, in consideration of the decimation of the pixels by the resolution conversion processing. Accordingly, the N depends on a magnification of the resolution conversion in the first direction in step S120. For example, as described above, when the resolution is converted from 600 dpi into 300 dpi in the Y direction in step S120, N=2 because a magnification of the conversion is ½. Further, provided that the conversion magnification in the Y direction in step S120 is ⅓, N=3.

Note that the conversion magnification employed in step S120 does not necessarily become a value of 1/integer. It is sufficient for the control unit 11 to set the N to an integer of 2 or greater, the integer approximating the denominator when the conversion magnification employed regarding the first direction in step S120 is expressed by a fraction where the numerator is 1. Here, the description will be continued supposing N=2. The N=2 means that the unit region and the identical color pixel region are both constituted by two pixels arranged consecutively in the first direction.

In the embodiment, the pixels constituting the identical color pixel region assume pixels corresponding to the ruled line and the like. Accordingly, the pixels constituting the identical color pixel region are subject to a condition that colors of the pixels are not a background color. The background color refers to a color commonly used as a background, such as white, white gray, light yellow, and the like. In the embodiment, a certain color gamut including white is preset as the background color. Thus, it is sufficient for the shift processing unit 12a to determine as "Yes" in step S112, when an region in which the pixel not corresponding to the background color and has the same color as each other continues for two pixels spans across two unit regions within the processing region 41.

In step S113, the shift processing unit 12a determines whether a shift amount in the +Y direction and a shift amount in the −Y direction that are necessary to cause the identical color pixel region to be included in the unit region are equal to each other. Then, when the shift amount in the +Y direction differs from the shift amount in the −Y direction, the process proceeds from a determination of "No" to step S114, while when the shift amount in the +Y direction is equal to the shift amount in the −Y direction, the process proceeds from a determination of "Yes" to step S115.

Incidentally, provided that N=2, the shift amount in the +Y direction and the shift amount in the −Y direction that are necessary to cause the identical color pixel region spanning across two unit regions to be included in any one of the unit regions are both one pixel, thus, a determination of "Yes" is made in step S113.

In step S114, the shift processing unit 12a shifts the identical color pixel region in a direction in which a shift amount necessary to cause the identical color pixel region to be included in the unit region is less between in the +Y direction and in the −Y direction, to cause the identical color pixel region to be included in the unit region. Step S114 corresponds to an example of FIG. 7A described below.

On the other hand, in step S115, the shift processing unit 12a shifts the identical color pixel region in the −Y direction to cause the identical color pixel region to be included in the unit region.

When a plurality of the identical color pixel regions each of which spanning across two unit regions exist within the processing region 41, the determination in step S113, and step S114 or step S115 are performed for each of such identical color pixel regions.

Steps S112, S113, S114, and S115 correspond to the shifting step.

When a determination of "No" is made in step S112 in regard with a certain processing region 41, the shifting step terminates without causing a shifting of pixel, in regard with the certain processing region 41.

In step S116 following the shifting step, the averaging processing unit 12b determines whether all of the pixels within the unit region have an identical color for each of the unit regions within the processing region 41 specified in step S111. Then, when all of the unit regions within the processing region 41 have an identical color within the unit region, the process proceeds from a determination of "Yes" to step S118. On the other hand, in a situation when any one or more of the unit regions within the processing region 41 include pixels that differ in color from each other within the unit region, the process proceeds from a determination of "No" to step S117.

In step S117, the averaging processing unit 12b averages colors of pixels within the unit region for the unit regions that do not satisfy a condition that all of the pixels have an identical color. Steps S116 and S117 correspond to the averaging step.

When a determination of "Yes" is made in step S116 in regard with a certain processing region 41, the averaging step terminates without performing step S117, in regard with the unit regions within the certain processing region 41. This is because when a determination of "Yes" is made in step S116, colors are already equalized within region for each of the unit regions, which makes it unnecessary to perform step S117. That is, even when step S117 is skipped after the determination of "Yes" is made in step S116, colors of pixels are in an averaged state within the unit region.

After the averaging step, in step S118, the shift processing unit 12a determines whether all of the processing regions have been specified, and terminates step S110 with a determination of "Yes" when all of the processing regions have been specified, and causes the process to proceed to step S120. That is, the shift processing unit 12a determines as "Yes" in step S118 when no region not having been specified as the processing region 41 exists within the image data 40. On the other hand, when a region not having been specified as the processing region 41 remains within the image data 40, the shift processing unit 12a proceeds from the determination of "No" in step S118 to step S111, to specify one next processing region 41.

Figure 5:
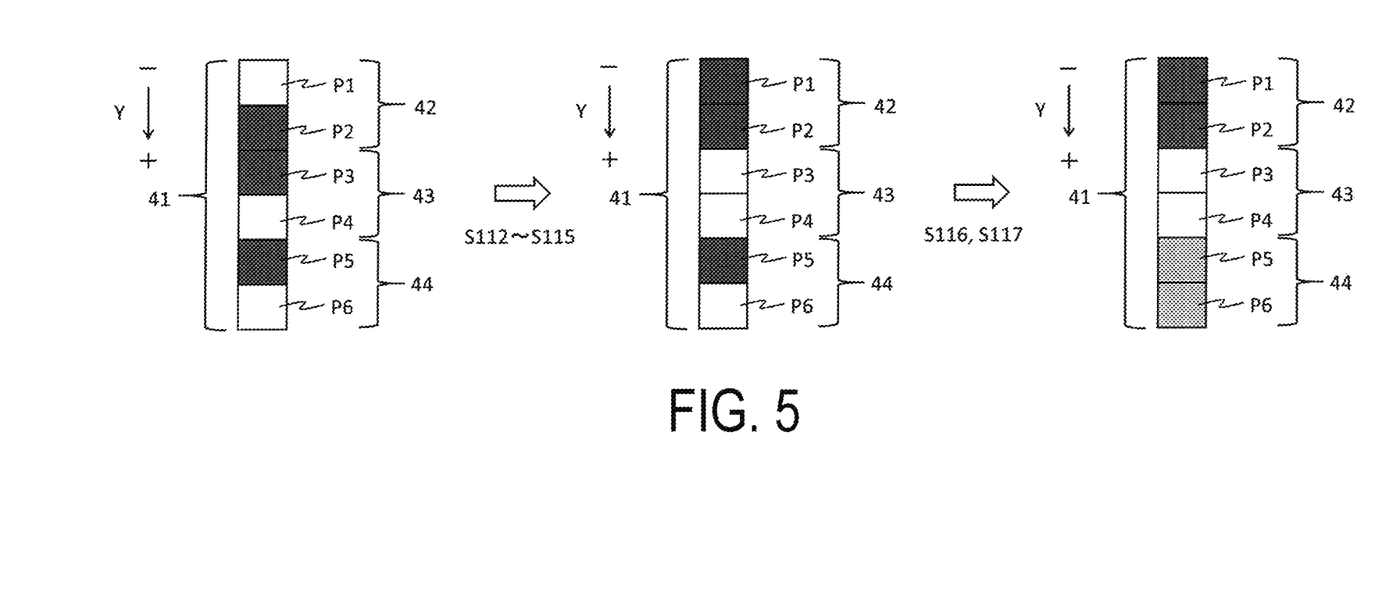
FIG. 5 is a diagram for describing a shifting step and an averaging step based on specific examples.

FIG. 5 is a diagram for describing the shifting step and the averaging step based on specific examples. In the example illustrated in FIG. 5, the shifting step and the averaging step are performed for one processing region 41, thereby changing the color within the processing region 41. The processing region 41 is formed of six pixels P1, P2, P3, P4, P5, and P6 that are aligned in the Y direction that is the first direction. That is, according to the example in FIG. 5, in step S111, six pixels arranged consecutively in the Y direction are specified as one processing region 41. As described above, N=2, and thus, in FIG. 5, three consecutive unit regions each of which constituted by two pixels are aligned in the Y direction constitute the processing region 41. That is, the pixels P1 and P2 are one unit region 42, the pixels P3 and P4 are one unit region 43, and the pixels P5 and P6 are one unit region 44.

In the processing region 41 illustrated at the left in FIG. 5, the pixels P1, P4, and P6 of white color are pixels of the background color. Also, in the processing region 41 illustrated at the left in FIG. 5, the pixels P2, P3, and P5 of thick gray color all have an identical color, and the pixels P2 and P3 are arranged consecutively in the Y direction. Thus, in the processing region 41 illustrated at the left in FIG. 5, the pixels P2 and P3 correspond to the identical color pixel region. The pixel P5 has the same color as the pixels P2 and P3, and the pixel P5 does not correspond to the identical color pixel region because the pixel P5 is not consecutive to a pixel of the same color as the pixel P5. Moreover, the identical color pixel region consisting of the pixels P2 and P3 spans across the unit region 42 and the unit region 43. Thus, due to the existence of the identical color pixel region consisting of the pixels P2 and P3, the shift processing unit 12a determines as "Yes" in step S112, and proceeds to step S113.

In this case, because a shift amount for shifting the identical color pixel region consisting of the pixels P2 and P3 to the unit region 42 and a shift amount for shifting the identical color pixel region to the unit region 43 are the same amount, that is, one pixel, the shift processing unit 12a determines as "Yes" in step S113 and performs step S115. At the center within FIG. 0.5, the processing region 41 on which the processing in step S115 has been performed is illustrated. That is, as a result of shifting the identical color pixel region consisting of the pixels P2 and P3 so as to be included in the unit region 42, the color of the pixel P1 comes to have the same color as the color of the pixel P2 before being shifted, and the color of the pixel P2 comes to have the same color as the color of the pixel P3 before being shifted. Note that the color of the pixel P2 is consequently unchanged before and after being shifted. The color of the pixel P3 also switches to the background color after being shifted. According to such a processing region 41 illustrated at the center within FIG. 5, the state where the identical color pixel region spans across the unit regions 42 and 43 is resolved.

For the unit regions 42, 43, and 44 of the processing region 41 illustrated at the center in FIG. 5, the averaging processing unit 12b makes the determination in step S116. At this time, at least in the unit region 44, the pixel P5 does not have the same color as the pixel P6, thus a determination of "No" is made in step S116 and the averaging in step S117 is performed. As for the unit region 42, step S117 is not performed because the pixel P1 already has the same color as the pixel P2. As for the unit region 43, the pixels P3 and P4 both have the background color, however, if there is a difference in the colors of the pixels P3 and P4, the averaging in step S117 is performed.

At the right within FIG. 5, the processing region 41 on which the processing in step S117 has been performed is illustrated. According to this, in each of the unit regions 42, 43, and 44 constituting the processing region 41, colors of pixels are equalized within the unit region. In the unit region 44, the colors of the pixels P5 and P6 have changed to an average color of the pixel P5 that was originally in thick gray color and the pixel P6 that was in the background color.

Referring back to FIG. 2, the description will be continued.

In step S120, the resolution conversion unit 12c performs resolution conversion processing on the input image. For example, provided that the resolution of 600 dpi in the Y direction of the input image is converted into 300 dpi, the resolution conversion unit 12c decimates one pixel for each of the unit regions in the image data 40, the unit regions each consisting of two pixels aligned in the Y direction, and being aligned in the Y direction. Moreover, for example, provided that the resolution of 600 dpi in the X direction of the input image is converted into 300 dpi, it is sufficient for the resolution conversion unit 12c to decimate one pixel for each of the unit regions, each of which consisting of two pixels aligned in the X direction, aligned in the X direction in the image data 40.

In step S130, the color conversion unit 12d performs color conversion processing on the image data 40 on which the resolution conversion has been performed. That is, a color coordinate system of the image data 40 is converted into a color coordinate system of ink used for recording by the printer 20. For example, when the printer 20 is a type of equipment that uses CMYK ink and colors of pixels are gradation-expressed by RGB in the image data 40, gradation values of RGB are converted into gradation values of CMYK for each of the pixels. The gradation values are values in the 256 gradation range from 0 to 255, for example. The color conversion processing can be performed by referencing an arbitrary color conversion lookup table defining a conversion relationship from RGB to CMYK.

In step S140, the HT processing unit 12e generates recording data when the image data 40 on which the color conversion processing has been performed is subjected to halftone processing. A specific method for the halftone processing is not particularly regarded, and dithering method, error diffusion method, and the like can be employed. The halftone processing generates recording data defining dot discharge (dot-on) or dot non-discharge (dot-off) of each ink of CMYK for each of the pixels. It goes without saying that information on the dot-on in the recording data may be information defining which of a plurality of types of dots having mutually different sizes such as large-dot, medium-dot, and small-dot is discharged, for example.

In step S150, the recording control unit 12f performs an output processing that causes the printer 20 to perform recording based on the recording data generated in step S140. That is, the recording control unit 12f rearranges the recorded data in the order in which the recorded data are to be transferred to the printer 20, and then sequentially transfers the recorded data to the printer 20. The processing of the rearrangement is also referred to as a rasterization processing. The recording control unit 12f also transmits recording condition information to the printer 20 together with the recording data on which the rasterization processing has been performed. As a result, the printer 20 drives the transport mechanism 21, the recording head 22, and the carriage 23 based on the recording condition information and the recording data that are transmitted from the image processing apparatus 10, thereby recording a content expressed by the input image on the recording medium.

3. Examples

Figure 6A:
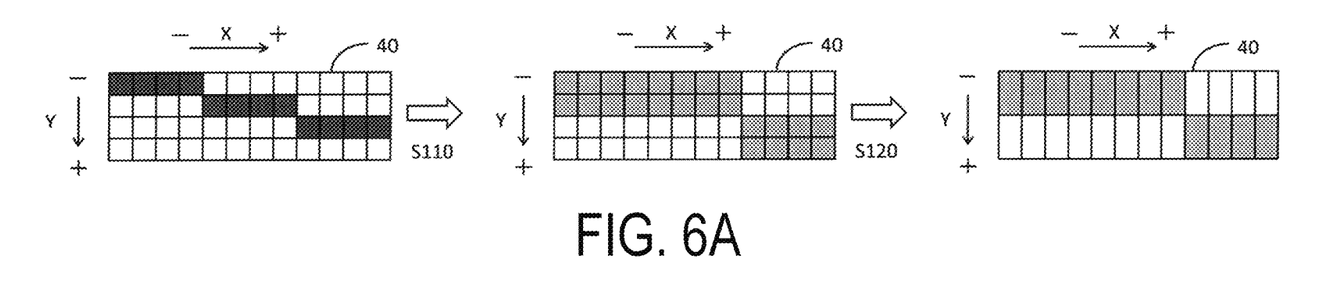
FIG. 6A is a diagram illustrating a first example.

FIG. 6A is a diagram for describing steps S110 and S120 based on examples. A content illustrated in FIG. 6A are referred to as a first example. FIG. 6A illustrates a part of the image data 40. That is, the image data 40 on which the preprocessing (step S110) is to be performed are illustrated at the left in FIG. 6A, the image data 40 on which step S110 has been performed and the resolution conversion processing (step S120) is to be performed are illustrated at the center, and the image data 40 for which step S120 has been performed are illustrated at the right. In the first example, step S110 and step S120 are performed provided that the Y direction is the first direction. In step S120, the resolution in the Y direction is reduced to ½. Thus, N=2 in the first example. In the image data 40 in the first example, four consecutive pixels in the Y direction are one processing region, where the one processing region is constituted by a unit region consisting of two pixels on the −Y direction side and a unit region consisting of two pixels on the +Y direction side. That is, in the example illustrated in FIG. 5, one processing region is constituted by a unit region multiplied by 3, the unit region consisting of two pixels, however, in the first example, one processing region is constituted by a unit region multiplied by 2, the unit region consisting of two pixels.

Within the image data 40 in the first example, a ruled line having a width of one pixel and oriented in an oblique direction with respect to each of the X direction and the Y direction is expressed in thick gray color. In FIG. 6A, the pixels to which the thick gray color of the ruled line is applied all have an identical color. The pixel of white color within the image data 40 is the pixel of the background color as in FIG. 5. According to the image data 40 in the first example, the identical color pixel region does not exist within each of the processing regions before step S110 is performed. Thus, in the first example, step S117 of step S110 averages colors for each of the unit regions in each of the processing regions, and in the unit regions each including one pixel corresponding to the ruled line, colors of pixels within the unit region are equalized to a color thinner than a color of the ruled line. Then, in the first example, one pixel is decimated in each of the unit regions in step S120, and the number of pixels per inch in the Y direction is reduced by half. By performing the averaging for each of the unit regions in step S117 of step S110, the color of the ruled line remains to a certain degree even after the pixel is decimated in step S120, and the ruled line is avoided from being erased.

Figure 6B:
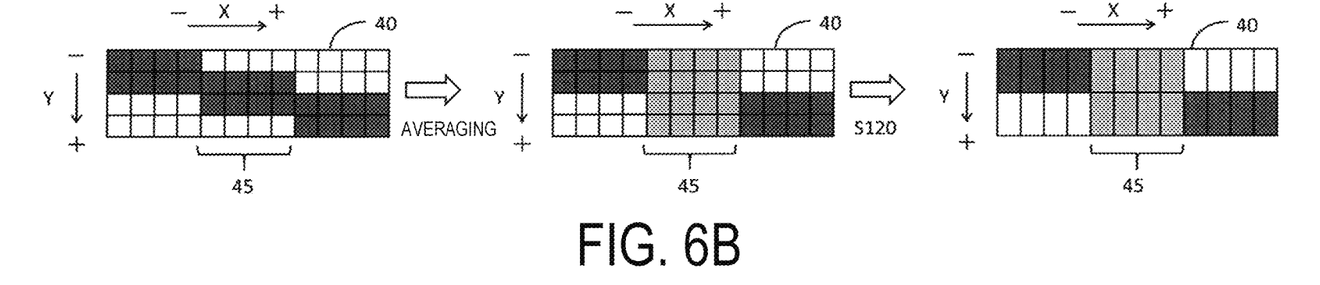
FIG. 6B is a diagram illustrating a known example.
Figure 6C:
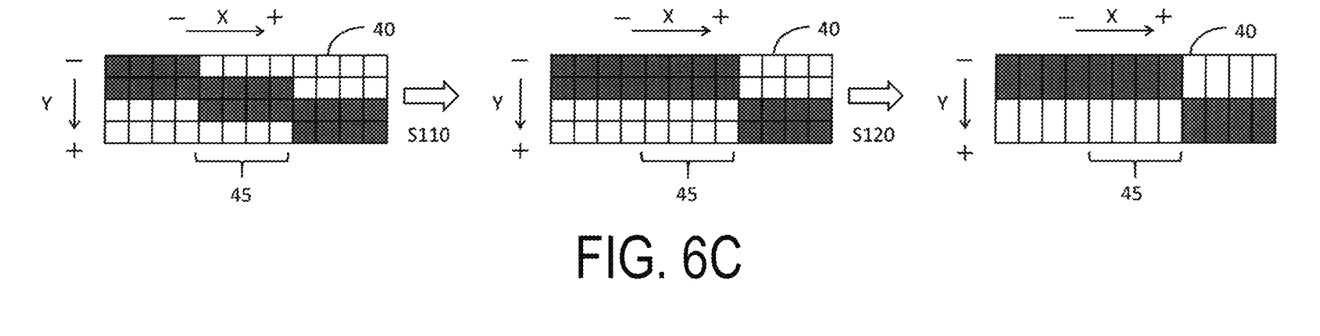
FIG. 6C is a diagram illustrating a second example.

Next, FIGS. 6B and 6C will be described. How to view each of FIGS. 6B and 6C is the same as how to view FIG. 6A. As for FIGS. 6B and 6C, and FIGS. 7A and 7B that will be described later, differences from the first example, which have been described in FIG. 6A, will be mainly described.

FIG. 6B illustrates a processing example without the shifting step according to the embodiment, which is referred to as a known example. Within the image data 40 in the known example, a ruled line having a width of two pixels and oriented in an oblique direction is expressed in thick gray color. Thus, according to the image data 40 in the known example, the identical color pixel region exists within each of the processing regions. Further, in a processing region group 45 in which four processing regions indicated by the reference sign 45 are aligned in the X direction among the processing regions constituting the image data 40 in the known example, the identical color pixel region spanning across the unit regions is included within each of the processing regions. When the averaging within the unit region is performed for each of the processing regions in such a processing region group 45 without performing the shifting step, colors of pixels are equalized within each of the unit regions across each of which the identical color pixel region spans as illustrated in the image data 40 at the center of the known example, which doubles a width of the ruled line in the processing region group 45.

Accordingly, in the known example, even after one pixel is decimated in each of the unit regions in step S120 and the number of pixels per inch in the Y direction becomes reduced by half, a part of the ruled line, which was in the processing region group 45, is doubled in width compared to other part of the ruled line, which is visually recognized as image quality deterioration. In addition, the widened part of such a ruled line may appear as a double line in a recording result of the recording medium, which becomes a reason for downgrading an assessment of image quality.

FIG. 6C is a diagram for describing steps S110 and S120 based on the examples. A content illustrated in FIG. 6C is referred to as a second example. The second example differs from the known example illustrated in FIG. 6B in that step S110 including the shifting step is performed. That is, in the second example, for each of the processing regions of the processing region group 45, a determination of "Yes" is made in step S112 of step S110, and the identical color pixel region in each of the processing regions of the processing region group 45 is shifted into the unit region in step S115. As a result, as illustrated at the center within FIG. 6C, the state where the identical color pixel region spans across two unit regions is resolved. As a result, the ruled line in the processing region group 45 is avoided from being doubled in width by the averaging processing compared to other part of the ruled line unlike the known example, which eliminates the occurrence of the image quality deterioration as described above.

Figure 7A:
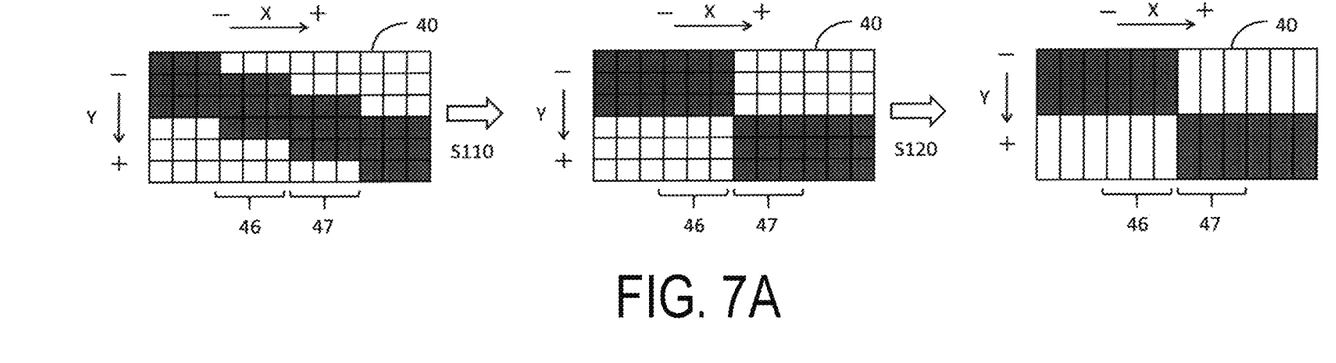
FIG. 7A is a diagram illustrating a third example.
Figure 7B:
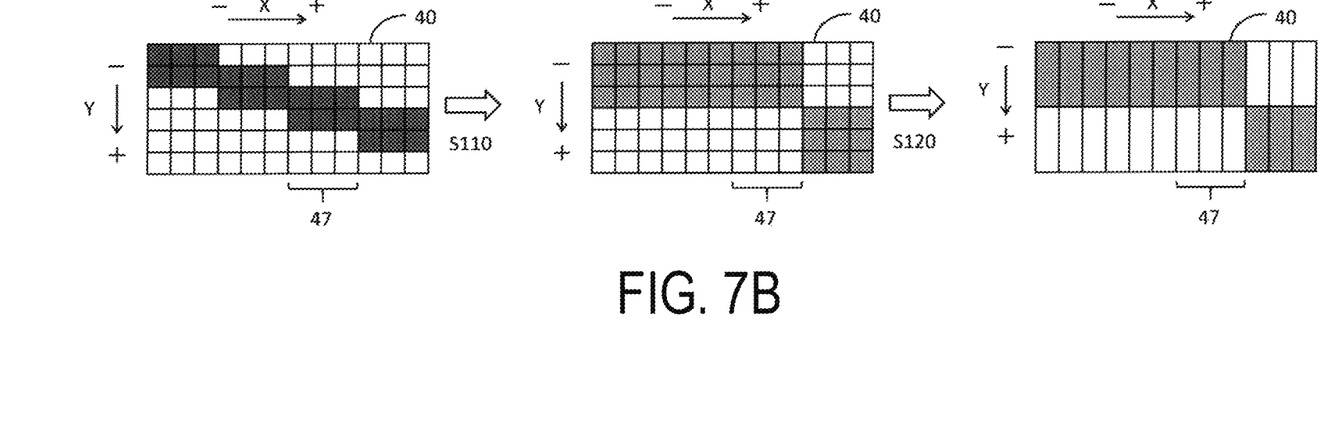
FIG. 7B is a diagram illustrating a fourth example.

FIGS. 7A and 7B are diagrams for illustrating steps S110 and S120 based on the examples, respectively. How to view each of FIGS. 7A and 7B is also the same as how to view FIGS. 6A, 6B, and 6C, and in FIGS. 7A and 7B, the number of pixels in the processing region and the number of pixels in the unit region are different from those in FIGS. 6A, 6B, and 6C. A content illustrated in FIG. 7A is referred to as a third example, and a content illustrated in FIG. 7B is referred to as a fourth example.

In step S120 of the third and fourth examples, the resolution in the Y direction is reduced to ⅓. Thus, N=3 in the third and fourth examples. In the image data 40 in the third and fourth examples, six consecutive pixels in the Y direction are one processing region, where the one processing region is constituted by a unit region consisting of three pixels on the −Y direction side and a unit region consisting of three pixels on the +Y direction side. That is, in the third and fourth examples, one processing region is constituted by a unit region multiplied by 2, the unit region consisting of three pixels.

Within the image data 40 in the third example, a ruled line having a width of three pixels and oriented in an oblique direction is expressed in thick gray color. Thus, according to the image data 40 in the third example, the identical color pixel region exists within each of the processing regions. Further, in a processing region group 46 in which three processing regions indicated by the reference sign 46 are aligned in the X direction among the processing regions constituting the image data 40 in the third example, the identical color pixel region spanning across the unit regions is included within each of the processing regions. Similarly, in a processing region group 47 indicated by the reference sign 47 in which three processing regions are aligned in the X direction as well, the identical color pixel region spanning across the unit regions is included within each of the processing regions.

In the third example, for each of the processing regions of the processing region group 46, a determination of "Yes" is made in step S112 of step S110, and the identical color pixel region in each of the processing regions of the processing region group 46 is shifted into the unit region on the −Y direction side in step S114. This is because, as for the identical color pixel region in each of the processing regions of the processing region group 46, among three pixels aligned in the Y direction to constitute one identical color pixel region, two pixels exist within the unit region on the −Y direction side and one pixel exists within the unit region on the +Y direction side, and the shift amount in the −Y direction is less than the shift amount in the +Y direction. Further, in the third example, for each of the processing regions of the processing region group 47, a determination of "Yes" is made in step S112, and the identical color pixel region in each of the processing regions of the processing region group 47 is shifted into the unit region on the +Y direction side in step S114. This is because, as for the identical color pixel region in each of the processing regions of the processing region group 47, among three pixels aligned in the Y direction to constitute one identical color pixel region, one pixel exists within the unit region on the −Y direction side and two pixels exist within the unit region on the +Y direction side, and the shift amount in the +Y direction is less than the shift amount in the −Y direction. As a result, as illustrated at the center within FIG. 7A, the state where the identical color pixel region spans across two unit regions is resolved.

Then, in the third example, two pixels are decimated in each of the unit regions in step S120, and the number of pixels per inch in the Y direction is reduced to ⅓. According to such a third example, the ruled lines of the processing region groups 46 and 47 are avoided from being doubled in width by the averaging processing compared to other part of the ruled line, which eliminates the occurrence of the image quality deterioration as described in the known example.

Within the image data 40 in the fourth example, a ruled line having a width of two pixels and oriented in an oblique direction is expressed in thick gray color. Thus, according to the image data 40 in the fourth example, there exists the identical color pixel region that satisfies a condition that two to N pixels of an identical color are arranged consecutively in the Y direction within each of the processing regions. Further, in the processing region group 47 in which three processing regions are aligned in the X direction among the processing regions constituting the image data 40 in the fourth example, the identical color pixel region spanning across the unit regions is included within each of the processing regions. Thus, in the fourth example, for each of the processing regions of the processing region group 47, a determination of "Yes" is made in step S112 of step S110, and the identical color pixel region in each of the processing regions of the processing region group 47 is shifted into the unit region on the −Y direction side in step S115. As a result, the state where the identical color pixel region spans across the two unit regions is resolved.

Moreover, in the fourth example, one unit region is constituted by three pixels, while one identical color pixel region is constituted by two pixels, and thus the averaging in step S117 is performed in each of the unit regions each including the identical color pixel region. As a result, in the unit regions each including the identical color pixel region of the color of the ruled line at the time when the shifting step is terminated, colors of pixels within the unit region are equalized to a color thinner than the color of the ruled line. Then, in the fourth example, two pixels are decimated in each of the unit regions in step S120, and the number of pixels per inch in the Y direction is reduced to ⅓. According to such a fourth example, the ruled line of the processing region group 47 is avoided from being doubled in width by the averaging processing compared to other part of the ruled line, which eliminates the occurrence of the image quality deterioration as described in the known example.

4. Summary

According to the embodiment, the image processing method includes the shifting step for determining whether to shift an identical color pixel region in which two to N pixels of an identical color are arranged consecutively in the first direction within the image data in the first direction or the direction opposite to the first direction, where N is an integer of 2 or greater, and when performance of the shift is determined, shifting the identical color pixel region in the first direction or the direction opposite to the first direction, and the averaging step for averaging, after the shifting step, colors of pixels within a unit region in which N pixels are arranged consecutively in the first direction within the image data. In the shifting step, performance of the shift is determined when the identical color pixel region spans across two unit regions, and the identical color pixel region spanning across two unit regions is shifted so as to be included in any one of the unit regions.

According to the above-described configuration, the state where the identical color pixel region spans across two unit regions is resolved before the averaging step. This make it possible to eliminate adverse effects that image quality deterioration occurs, which is, for example, the ruled line and the like expressed by the identical color pixel region partly become wider than necessary or partly appear as a double line when merely performing the averaging described above.

Further, according to the embodiment, in the shifting step, when performance of the shift is determined, the identical color pixel region is shifted in the direction in which the shift amount necessary to cause the identical color pixel region to be included in the unit region is less between in the first direction and in the direction opposite to the first direction.

According to the above-described configuration, a change in the content such as the ruled line that the image data originally expressed can be minimized by reducing the shift amount of the identical color pixel region as much as possible.

Further, according to the embodiment, the image processing method includes the region specifying step for sequentially specifying, in the first direction, a region in which pixels are arranged consecutively in the first direction within the image data, the region being the processing region including a plurality of the unit regions. Then, the shifting step is performed for the processing region specified in the region specifying step.

When sequentially specifying the processing region by shifting the processing region in the first direction within the image data, a processing region in which the number of pixels is less than the intrinsically necessary number may be specified depending on the number of pixels in the first direction of the image data when the processing region is specified at a leading end of the image data in the first direction. In such a case, when the identical color pixel region is shifted in the first direction, the identical color pixel region may be partly lost at the shift destination. Under such a circumstance, in the shifting step, when performance of the shift is determined, the identical color pixel region is shifted in the direction opposite to the first direction provided that a shift amount in the first direction is equal to a shift amount in the direction opposite to the first direction. According to such a configuration, the above-described situation in which the identical color pixel region is partly lost can be avoided.

In addition to the image processing method, the embodiment also discloses various categories of disclosure such as the image processing apparatus 10 and the program 12.

The image processing apparatus 10 includes the shift processing unit 12a configured to perform shift processing of determining whether to shift the identical color pixel region in which two to N pixels of an identical color are arranged consecutively in the first direction within the image data 40 in the first direction or the direction opposite to the first direction, where N is an integer of 2 or greater, and when performance of the shift is determined, performing shift processing of shifting the identical color pixel region in the first direction or the direction opposite to the first direction, and the averaging processing unit 12b configured to average, after the shift processing, colors of pixels within a unit region in which N pixels are arranged consecutively in the first direction within the image data. When the identical color pixel region spans across two unit regions, the shift processing unit 12a determines to perform the shifting, and shifts the identical color pixel region spanning across two unit regions so as to be included in any one of the unit regions.

5. Modified Examples

Several modified examples included in the embodiment will be described.

Figure 8:
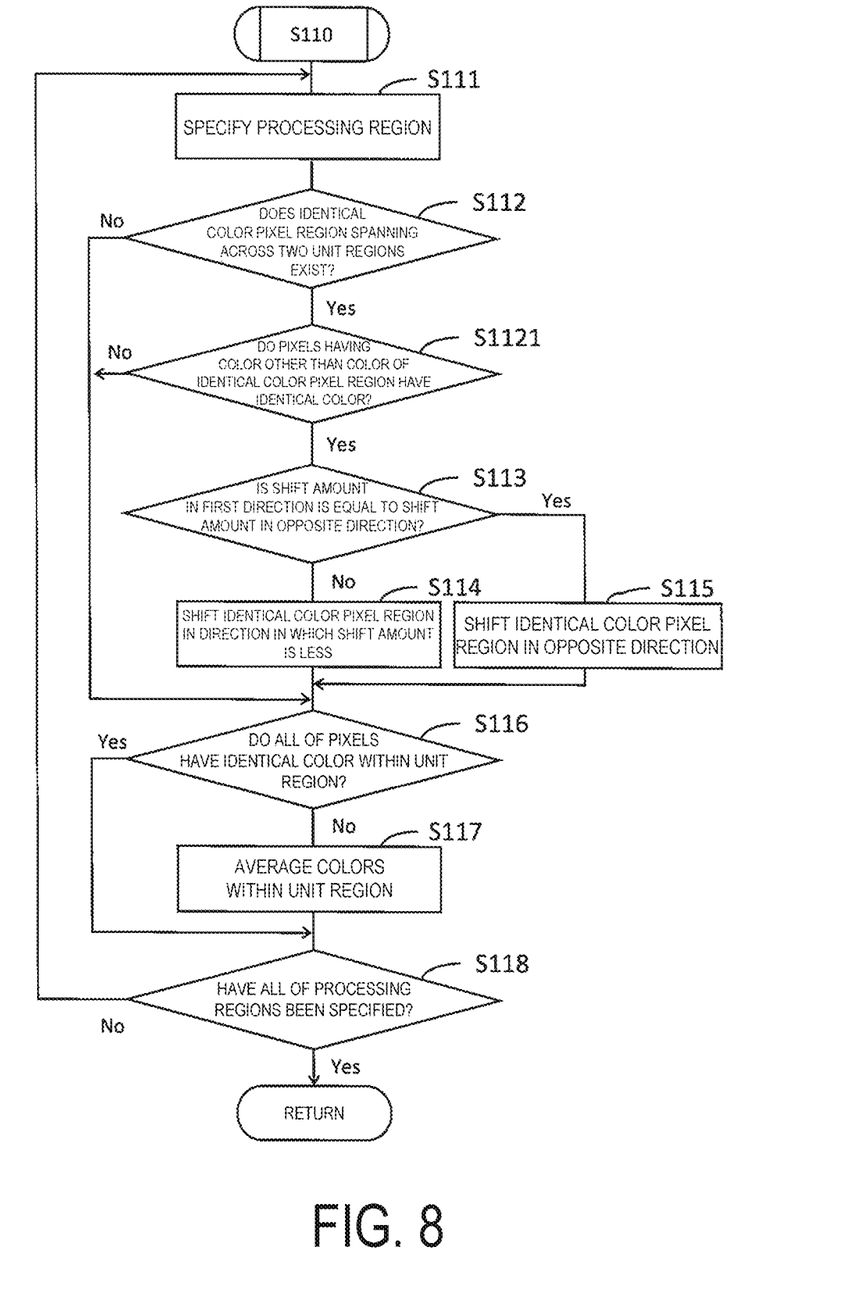
FIG. 8 is a flowchart illustrating details of step S110 according to a modified example.

FIG. 8 is a flowchart illustrating details of step S110 according to one modified example. FIG. 8 differs from FIG. 3 in that "Yes" in step S112 is followed by making a determination in step S1121. In step S1121, the shift processing unit 12a determines whether pixels having a color other than the color of the identical color pixel region spanning across the unit regions have an identical color within the processing region. The pixels having a color other than the color of the identical color pixel region spanning across the unit regions are pixels excluding the identical color pixel region spanning across the unit regions and pixels having the same color as the identical color pixel region.

Referring to the processing region 41 illustrated at the left in FIG. 5, the pixels P2 and P3 are the identical color pixel region spanning across the unit regions, and the pixels P2 and P3 and the pixel P5 have a color of the identical color pixel region spanning across the unit regions. Accordingly, the pixels P1, P4, and P6 other than the pixels P2, P3, and P5 correspond to pixels having a color other than the color of the identical color pixel region spanning across the unit regions. Thus, referring to FIG. 5, when the pixels P1, P4, and P6 within the processing region 41 all have an identical color, the shift processing unit 12a determines as "Yes" and proceeds to step S113, while when pixels having mutually different colors are included in the pixels P1, P4, and P6, the shift processing unit 12a determines as "No" and proceeds to step S116.

For example, when some pixels among the pixels P1, P4, and P6 have another color that is not the background color, there is a high possibility that, in the processing region 41, a content other than the ruled line and the like is drawn using a plurality of colors, rather than the ruled line and the like are simply drawn in the background color. When step S114 or step S115 is performed in such a case, there is a risk that a color of a content that the image data 40 originally expresses may be partly erased. Thus, in FIG. 8, the identical color pixel region spanning across the unit regions is shifted on the condition that a determination of "Yes" is made in step S1121.

Note that, when the pixels having a color other than the color of the identical color pixel region spanning across the unit regions have an identical color within the processing region 41, all of the pixels constituting two unit regions across which the identical color pixel region spans and excluding the identical color pixel region and pixels having the same color as the identical color pixel region inevitably have an identical color. Further, as illustrated in FIGS. 6A, 6C, 7A, and 7B, the processing region may be constituted by two unit regions. Thus, the modified example discloses a configuration in which, in the shifting step, performance of the shift is determined when all of the pixels constituting two unit regions across which the identical color pixel region spans and excluding the identical color pixel region and pixels having the same color as the identical color pixel region have an identical color. According to such a configuration, it is possible to avoid partly removing colors that are intrinsically expressed by the image data 40 to deteriorate the image quality.

The averaging processing performed in step S117 by the averaging processing unit 12b may be weighted averaging rather than simple averaging. For example, the averaging processing unit 12b, when performing averaging processing within a unit region including a pixel of the color of the identical color pixel region and the pixel of the background color, imparts a weight larger than the pixel of the background color on the pixel of the identical color pixel region and then calculates an average color, to set the color of the pixels within the unit region to the calculated color. Performing such weighted averaging enables to suppress fading of the colors of the ruled line and the like as much as possible.

A timing of performing the preprocessing in step S110 is not limited to a timing illustrated in the flowchart of FIG. 2. The control unit 11 may perform step S110 and step S120 for the image data 40 on which the color conversion processing has been performed in step S130, for example. Alternatively, the control unit 11 may perform step S110 and step S120 for the image data 40 on which HT processing in step S140 has been performed, that is, the recording data. Note that in step S110 for the recording data, processing such as averaging large dot-on pixels and dot-off pixels to define a medium dot-on at both of the pixels may be performed in the averaging processing in step S117, for example.

The shift processing unit 12a may sequentially shift the pixel range that is to be the processing region in the X direction every time step S111 is repeated, to specify one processing region 41, provided that the original point position "0" in the X direction and the Y direction in the image data 40 is designated as the starting position of specifying the processing region. A processing speed can be improved by causing the direction in which the pixel range is sequentially shifted to coincide with the direction in which the pixel data are sent.

When the printer 20 is a type of equipment that performs recording by the inkjet scheme, the printer 20 may not be a so-called serial inkjet printer in which the carriage 23 described so far is equipped with the recording head 22. The printer 20 may also be a type of equipment that does not include the carriage 23 and discharges a liquid by the recording head 22 of a line type that is elongated having a length that can cover a width of the recording medium in a direction intersecting the transport direction of the recording medium.

The embodiment may also be applied in a scene that does not premise performing recording of the input image on the recording medium by the printer 20. That is, when the input image is reduced in resolution by resolution conversion to cause the input image to be displayed on the display 13 or the other displays, the control unit 11 may perform step S110 as preprocessing of the resolution conversion processing.

What is claimed is:

1. An image processing method, comprising:
  a shifting step for determining whether to shift an identical color pixel region, in which two to N pixels of an identical color are arranged consecutively in a first direction, in the first direction or a direction opposite to the first direction within image data, where N is an integer of 2 or greater, and when performance of the shift is determined, shifting the identical color pixel region in the first direction or the direction opposite to the first direction; and
  an averaging step for averaging, after the shifting step, colors of pixels within a unit region, in which N pixels are arranged consecutively in the first direction, within the image data, wherein
  the shifting step includes determining the performance of the shift when the identical color pixel region spans across two of the unit regions, and shifting the identical color pixel region spanning across the two of the unit regions so as to be included in any one of the unit regions.

2. The image processing method according to claim 1, wherein,
  the shifting step includes, when performance of the shift is determined, shifting the identical color pixel region in one of the first direction and the direction opposite to the first direction to include the identical color pixel region in the unit region with less shift amount.

3. The image processing method according to claim 1, comprising:
  a region specifying step for sequentially specifying, in the first direction, a region in which pixels are arranged consecutively in the first direction, within the image data, the region being a processing region including a plurality of the unit regions, wherein the shifting step is performed for the processing region specified in the region specifying step, and the shifting step includes, when performance of the shift is determined, shifting the identical color pixel region in the direction opposite to the first direction provided that a shift amount in the first direction required for including the identical color pixel region in the unit region is equal to a shift amount in the direction opposite to the first direction required for including the identical color pixel region in the unit region.

4. The image processing method according to claim 1, wherein in the shifting step, performance of the shift is determined when all of the pixels constituting two of the unit regions across which the identical color pixel region spans and excluding the identical color pixel region and pixels having the same color as the identical color pixel region have an identical color.

5. An image processing apparatus, comprising:

a shift processing unit configured to perform shift processing of determining whether to shift an identical color pixel region, in which two to N pixels of an identical color are arranged consecutively in a first direction, in the first direction or a direction opposite to the first direction within the image data, where N is an integer of 2 or greater, and when performance of the shift is determined, performing shift processing of shifting the identical color pixel region in the first direction or the direction opposite to the first direction; and an averaging processing unit configured to average, after the shift processing, colors of pixels within a unit region, in which N pixels are arranged consecutively, in the first direction within the image data, wherein when the identical color pixel region spans across two of the unit regions, the shift processing unit determines to perform the shifting, and shifts the identical color pixel region spanning across the two of the unit regions so as to be included in any one of the unit regions.

\* \* \* \* \*